(12) United States Patent
Emira et al.

(10) Patent No.: US 11,356,136 B2
(45) Date of Patent: Jun. 7, 2022

(54) HARMONIC REJECTION IN MULTIPHASE SIGNALS

(71) Applicant: SHENZHEN GOODIX TECHNOLOGY CO., LTD., Shenzhen (CN)

(72) Inventors: Ahmed Emira, San Diego, CA (US); Faisal Hussien, San Diego, CA (US); Mostafa Elmala, San Diego, CA (US); Mohamed Aboudina, San Diego, CA (US)

(73) Assignee: Shenzhen Goodix Technology Co., Ltd., Shenzhen (CN)

(*) Notice: Subject to any disclaimer, the term of this patent is extended or adjusted under 35 U.S.C. 154(b) by 119 days.

(21) Appl. No.: 17/014,957

(22) Filed: Sep. 8, 2020

(65) Prior Publication Data
US 2022/0077883 A1 Mar. 10, 2022

(51) Int. Cl.
*H04B 1/30* (2006.01)
*H04B 1/16* (2006.01)

(52) U.S. Cl.
CPC ............ *H04B 1/30* (2013.01); *H04B 1/1615* (2013.01); *H04B 2001/307* (2013.01)

(58) Field of Classification Search
CPC .. H04B 1/30; H04B 1/1615; H04B 2001/307; H04B 10/697; H04B 10/6971–6973; H03D 2200/0086; H03D 2200/0088
See application file for complete search history.

(56) References Cited

U.S. PATENT DOCUMENTS

| | | | | |
|---|---|---|---|---|
| 5,051,704 A * | 9/1991 | Chapman | .............. | H03F 1/3235 330/149 |
| 6,614,854 B1 * | 9/2003 | Chow | .................. | H04L 27/368 332/162 |
| 6,646,505 B2 * | 11/2003 | Anderson | ............ | H03F 1/3276 330/144 |
| 6,677,870 B2 * | 1/2004 | Im | ........................ | H04B 1/0475 341/110 |
| 6,782,038 B1 * | 8/2004 | Khlat | .................... | H03D 7/165 375/147 |
| 6,801,082 B2 * | 10/2004 | Midya | .................. | H03F 1/0277 330/136 |

(Continued)

OTHER PUBLICATIONS

Van Liempd Barend et al.: "A 0.9 V 0.4-6 GHz Harmonic Recombination SDR Receiver in 28 nm CMOS With HR3/HR5 and IIP2 Calibra", IEEE Journal of Solid-State Circuits, IEEE, USA,vol. 49, No. 8, Aug. 1, 2014 total 12 pages.

(Continued)

*Primary Examiner* — James M Perez
(74) *Attorney, Agent, or Firm* — Kilpatrick Townsend & Stockton LLP

(57) ABSTRACT

A receiver circuit includes a mixer receiving an RF signal encoding an information signal. The mixer receives a number of multiphase oscillator signals and generates multiphase baseband signals. The receiver circuit also includes a variable gain circuit receives the multiphase baseband signals, generates a first output signal having a first distortion, and a second output signal having a second distortion. The variable gain circuit is configured to generate a reduced distortion output signal based on the first and second output signals.

20 Claims, 3 Drawing Sheets

(56) References Cited

U.S. PATENT DOCUMENTS

| | | | | |
|---|---|---|---|---|
| 6,838,931 B2* | 1/2005 | Midya | | H03G 3/004 |
| | | | | 330/10 |
| 7,164,901 B2* | 1/2007 | Zheng | | H03D 3/008 |
| | | | | 375/349 |
| 8,260,244 B2* | 9/2012 | Rafi | | H03D 7/165 |
| | | | | 455/240.1 |
| 8,340,214 B2* | 12/2012 | Kang | | H04L 25/03343 |
| | | | | 375/232 |
| 8,606,197 B2* | 12/2013 | Bai | | H03F 1/3294 |
| | | | | 455/105 |
| 8,611,459 B2* | 12/2013 | McCallister | | H03F 3/245 |
| | | | | 375/295 |
| 8,760,222 B2* | 6/2014 | Schwent | | H03F 1/0222 |
| | | | | 327/555 |
| 8,798,216 B2* | 8/2014 | Pullela | | H03D 7/165 |
| | | | | 455/302 |
| 8,895,913 B2* | 11/2014 | Tekin | | H03B 19/00 |
| | | | | 250/252.1 |
| 8,963,610 B2* | 2/2015 | Mishra | | H03D 7/1483 |
| | | | | 455/326 |
| 9,191,020 B2* | 11/2015 | Tekin | | H04L 7/0331 |
| 9,191,127 B2* | 11/2015 | Koli | | H03H 19/008 |
| 9,246,719 B2* | 1/2016 | Pullela | | H03D 7/165 |
| 9,442,066 B2* | 9/2016 | Tekin | | G01N 21/3581 |
| 9,602,184 B2* | 3/2017 | Honda | | H01Q 3/26 |
| 10,027,358 B2* | 7/2018 | Wu | | H03D 7/165 |
| 10,560,139 B2* | 2/2020 | Brunel | | H04B 17/11 |
| 10,567,093 B1* | 2/2020 | Buchwald | | G01R 29/0878 |
| 10,680,620 B2* | 6/2020 | Huang | | H03L 7/193 |
| 10,742,222 B2* | 8/2020 | Emira | | H04L 27/2695 |
| 10,778,188 B1* | 9/2020 | Karmaker | | H03F 3/68 |
| 10,873,486 B1* | 12/2020 | Aboudina | | H03F 3/189 |
| 11,177,988 B2* | 11/2021 | Aboudina | | H04B 1/12 |
| 2002/0186783 A1* | 12/2002 | Opas | | H03F 1/3247 |
| | | | | 375/297 |
| 2003/0184371 A1* | 10/2003 | Anderson | | H03F 1/3252 |
| | | | | 330/149 |
| 2005/0239430 A1* | 10/2005 | Shah | | H03D 7/1483 |
| | | | | 455/302 |
| 2009/0143031 A1* | 6/2009 | Shah | | H04B 1/28 |
| | | | | 455/150.1 |
| 2011/0201289 A1* | 8/2011 | Rafi | | H03D 7/165 |
| | | | | 455/139 |
| 2011/0222633 A1* | 9/2011 | Pullela | | H03D 7/165 |
| | | | | 375/318 |
| 2013/0064325 A1* | 3/2013 | Kilambi | | H03F 1/3241 |
| | | | | 375/297 |
| 2013/0225084 A1* | 8/2013 | Hall | | H04W 48/16 |
| | | | | 455/41.2 |
| 2014/0065989 A1* | 3/2014 | McLaurin | | H03F 3/189 |
| | | | | 455/114.3 |
| 2014/0073280 A1* | 3/2014 | Mikhemar | | H04B 1/123 |
| | | | | 455/310 |
| 2014/0084996 A1* | 3/2014 | Schwent | | H03F 1/0222 |
| | | | | 327/551 |
| 2014/0166868 A1* | 6/2014 | Tekin | | H03B 5/1228 |
| | | | | 250/252.1 |
| 2014/0329484 A1* | 11/2014 | Lau | | H04B 1/1027 |
| | | | | 455/296 |
| 2014/0347132 A1* | 11/2014 | Kawasaki | | H03F 3/24 |
| | | | | 330/291 |
| 2015/0063508 A1* | 3/2015 | Pullela | | H04L 25/08 |
| | | | | 375/349 |
| 2015/0094004 A1* | 4/2015 | Vora | | H03D 7/1441 |
| | | | | 455/114.1 |
| 2015/0222287 A1* | 8/2015 | Tekin | | H03M 1/001 |
| | | | | 341/110 |
| 2016/0097718 A1* | 4/2016 | Tekin | | G01N 21/3581 |
| | | | | 250/252.1 |
| 2018/0048339 A1* | 2/2018 | Wu | | H03D 7/165 |
| 2019/0115946 A1* | 4/2019 | Pehlke | | H04B 1/04 |
| 2019/0158137 A1* | 5/2019 | Brunel | | H04B 1/005 |
| 2020/0195256 A1* | 6/2020 | Emira | | H04L 27/0014 |
| 2020/0274522 A1* | 8/2020 | Karmaker | | H03F 3/68 |
| 2020/0382147 A1* | 12/2020 | Menkhoff | | H03F 3/195 |
| 2021/0234736 A1* | 7/2021 | Aboudina | | H03G 3/3052 |
| 2021/0234737 A1* | 7/2021 | Aboudina | | H04L 27/368 |
| 2021/0258030 A1* | 8/2021 | Han | | H04B 1/12 |

OTHER PUBLICATIONS

European Patent Office, Extended European Search Report Issued in Application No. 21195542.2, dated Feb. 4, 2022, Germany, 11 pages.

* cited by examiner

HARMONIC REJECTION IN MULTIPHASE SIGNALS

TECHNICAL FIELD

The subject matter described herein relates to harmonic rejection, and more particularly to harmonic rejection of multiphase signals.

BACKGROUND

Individual transmitted RF signals are frequently received at a receiver circuit at a RF carrier frequency modulated by a low frequency information signal. In some cases, the receiver extracts the low frequency modulating information signal using a down conversion process which generates multiphase in-phase I and quadrature Q signals. The down conversion process may generate undesired signals by down-converting signals at harmonics of the LO frequency which harms receiver fidelity performance. Techniques improving harmonic distortion are needed in the art.

SUMMARY

One inventive aspect is a receiver circuit. The receiver circuit includes a mixer configured to receive an RF signal, where the RF signal encodes an information signal, where the mixer is further configured to receive a number N of multiphase oscillator signals and to generate N multiphase baseband signals, and where the multiphase baseband signals encode a first representation of the information signal. The receiver circuit also includes a variable gain circuit including a plurality of amplifiers, each configured to receive a subset of the N multiphase baseband signals, where a first subset of the amplifiers collectively generate a first output signal that encodes a second representation of the information signal, where the first output signal has a first distortion, where a second subset of the amplifiers collectively generate a second output signal, where the second output signal has a second distortion, where each of the second subset of the amplifiers has a programmable gain which influences the second distortion, and where the first subset of the amplifiers is different from the second subset of the amplifiers. The variable gain circuit is configured to generate a reduced distortion output signal based on the first and second output signals, the reduced distortion output signal has a reduced distortion, the first and second distortions of the first and second output signals each have an influence on the reduced distortion of the reduced distortion output signal, and the influence of the second distortion on the reduced distortion of the reduced distortion output signal at least partly cancels the influence of the first distortion on the reduced distortion of the reduced distortion output signal.

In some embodiments, each of the first subset of amplifiers generates a first amplifier output, the first output signal includes the first amplifier outputs of the first subset of amplifiers, each of the second subset of amplifiers generates a second amplifier output, and the second output signal includes the second amplifier outputs of the second subset of amplifiers.

In some embodiments, the receiver circuit also includes a combiner configured to receive the first and second output signals and to generate the reduced distortion output signal based on the received first and second output signals.

In some embodiments, the first distortion includes a particular harmonic of a frequency of the multiphase oscillator signals, where the second distortion includes the particular harmonic of the frequency of the multiphase oscillator signals, and where the influence of the second distortion on the particular harmonic in the reduced distortion of the reduced distortion output signal at least partly cancels the influence of the first distortion on the particular harmonic in the reduced distortion of the reduced distortion output signal.

In some embodiments, the particular harmonic is the second harmonic of the frequency of the multiphase oscillator signals.

In some embodiments, a first portion of first subset of the amplifiers collectively generate an in-phase component of the first output signal, and where a second portion of first subset of the amplifiers collectively generate a quadrature component of the first output signal.

In some embodiments, a first portion of second subset of the amplifiers collectively generate an in-phase component of the second output signal, and a second portion of second subset of the amplifiers collectively generate a quadrature component of the second output signal.

In some embodiments, the in-phase component of the first output signal includes a first in-phase distortion, where the in-phase component of the second output signal includes a second in-phase distortion, and where a magnitude of the first in-phase distortion is greater than a magnitude of a sum of the first and second in-phase distortions. In addition, the quadrature component of the first output signal includes a first quadrature distortion, the quadrature component of the second output signal includes a second quadrature distortion, and a magnitude of the first quadrature distortion is greater than a magnitude of a sum of the first and second quadrature distortions.

Another inventive aspect is a method of using a receiver circuit. The method includes, with a mixer, receiving an RF signal, where the RF signal encodes an information signal, and with the mixer, receiving a number N of multiphase oscillator signals and generating N multiphase baseband signals, where the multiphase baseband signals encode a first representation of the information signal. The method also includes, with each of a plurality of amplifiers of a variable gain circuit, receiving a subset of the N multiphase baseband signals, and with a first subset of the amplifiers, collectively generating a first output signal that encodes a second representation of the information signal, where the first output signal has a first distortion. The method also includes, with a second subset of the amplifiers, collectively generating a second output signal, where the second output signal has a second distortion, where each of the second subset of the amplifiers has a programmable gain which influences the second distortion, and where the first subset of the amplifiers is different than the second subset of the amplifiers. The method also includes, with the variable gain circuit, generating a reduced distortion output signal based on the first and second output signals, where the reduced distortion output signal has a reduced distortion, where the first and second distortions of the first and second output signals each have an influence on the reduced distortion of the reduced distortion output signal, and where the influence of the second distortion on the reduced distortion of the reduced distortion output signal at least partly cancels the influence of the first distortion on the reduced distortion of the reduced distortion output signal.

In some embodiments, the method also includes, with each of the first subset of amplifiers, generating a first amplifier output, where the first output signal includes the first amplifier outputs of the first subset of amplifiers, and, with each of the second subset of amplifiers, generating a second amplifier output, where the second output signal includes the second amplifier outputs of the second subset of amplifiers.

In some embodiments, the method also includes, with a combiner, receiving the first and second output signals, and generating the reduced distortion output signal based on the received first and second output signals.

In some embodiments, the first distortion includes a particular harmonic of a frequency of the multiphase oscillator signals, where the second distortion includes the particular harmonic of the frequency of the multiphase oscillator signals, and where the influence of the second distortion on the particular harmonic in the reduced distortion of the reduced distortion output signal at least partly cancels the influence of the first distortion on the particular harmonic in the reduced distortion of the reduced distortion output signal.

In some embodiments, the particular harmonic is the second harmonic of the frequency of the multiphase oscillator signals.

In some embodiments, a first portion of first subset of the amplifiers collectively generate an in-phase component of the first output signal, and a second portion of first subset of the amplifiers collectively generate a quadrature component of the first output signal.

In some embodiments, a first portion of second subset of the amplifiers collectively generate an in-phase component of the second output signal, and a second portion of second subset of the amplifiers collectively generate a quadrature component of the second output signal.

In some embodiments, the in-phase component of the first output signal includes a first in-phase distortion, where the in-phase component of the second output signal includes a second in-phase distortion, and where a magnitude of the first in-phase distortion is greater than a magnitude of a sum of the first and second in-phase distortions, and the quadrature component of the first output signal includes a first quadrature distortion, where the quadrature component of the second output signal includes a second quadrature distortion, and where a magnitude of the first quadrature distortion is greater than a magnitude of a sum of the first and second quadrature distortions.

In some embodiments, the method also includes, programming the programmable gain of each of the second subset of the amplifiers.

In some embodiments, the method also includes, measuring the first distortion, where programming the programmable gain of each of the second subset of the amplifiers includes causing a magnitude of a sum of the first and second distortions to be less than a magnitude of the first distortion.

In some embodiments, measuring the first distortion, and programming the programmable gain of each of the second subset of the amplifiers is performed as part of a test procedure.

In some embodiments, measuring the first distortion, and programming the programmable gain of each of the second subset of the amplifiers is performed as part of a calibration.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations.

When practical, similar reference numbers denote similar structures, features, or elements.

DETAILED DESCRIPTION

Particular embodiments of the invention are illustrated herein in conjunction with the drawings. Particular embodiments of the invention are illustrated herein in conjunction with the drawings.

Various details are set forth herein as they relate to certain embodiments. However, the invention can also be implemented in ways which are different from those described herein. Modifications can be made to the discussed embodiments by those skilled in the art without departing from the invention. Therefore, the invention is not limited to particular embodiments disclosed herein.

Figure 1A:
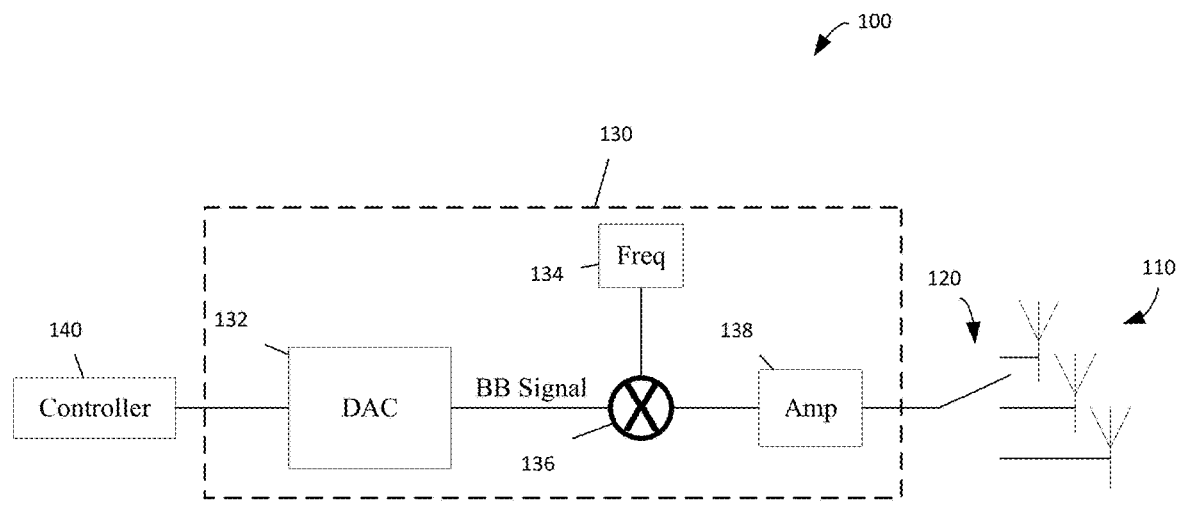
FIG. 1A is a schematic diagram of an embodiment of a transmitter circuit according to an embodiment.
Figure 1B:
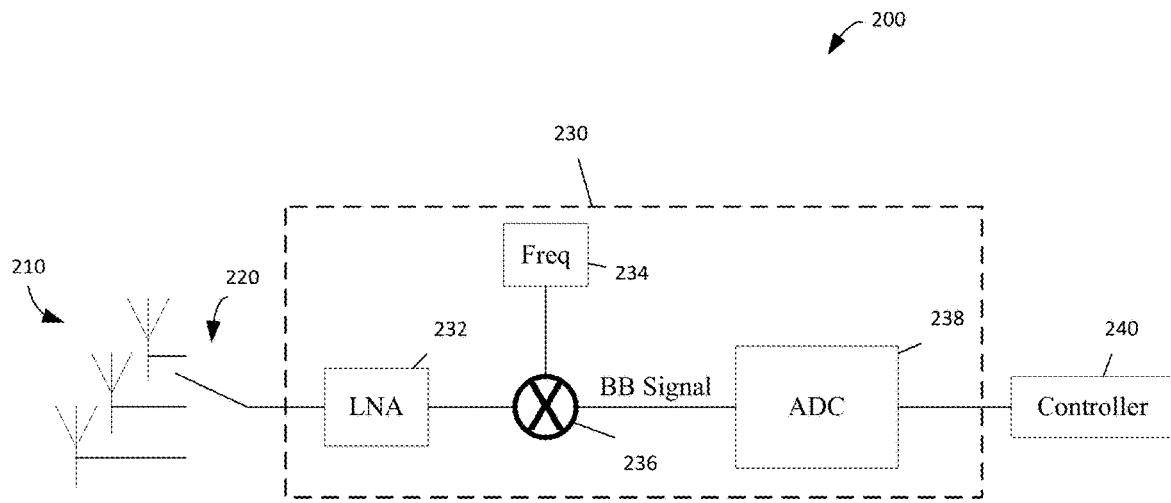
FIG. 1B is a schematic diagram of an embodiment of a receiver circuit according to an embodiment.
Figure 2:
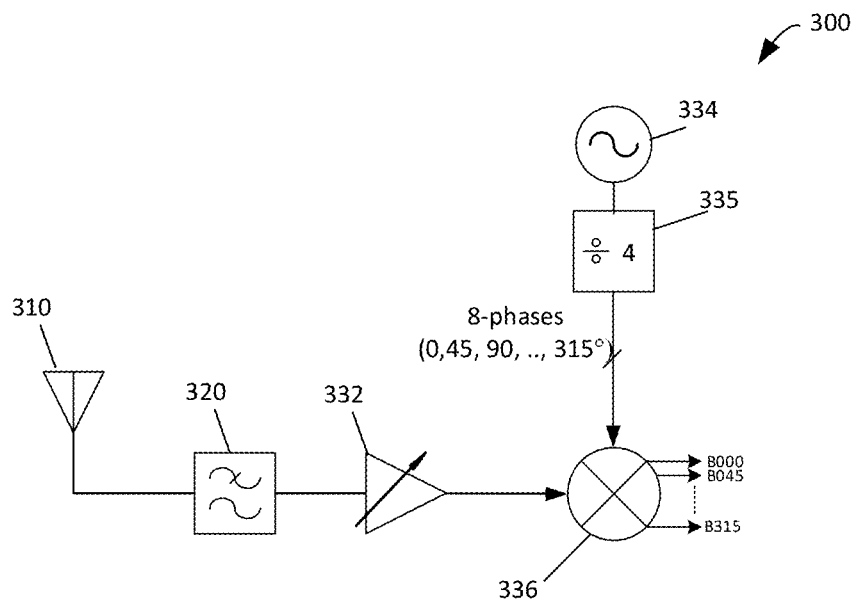
FIG. 2 illustrates a schematic diagram of portions of a receiver circuit generating multiphase baseband signals.
Figure 3:
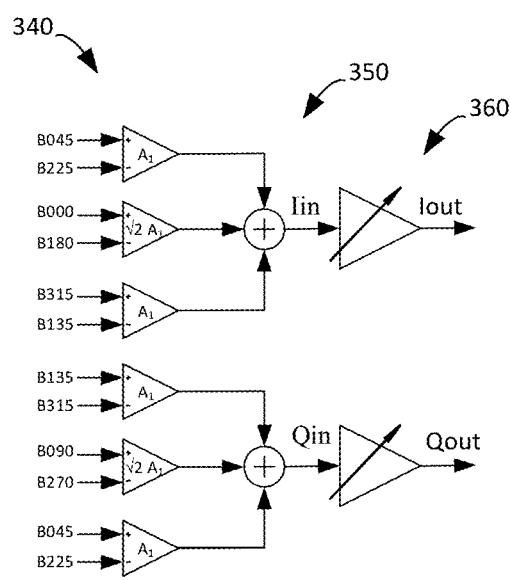
FIG. 3 illustrates a schematic diagram of a variable gain circuit of a receiver circuit generating multiphase baseband signals.
Figure 4:
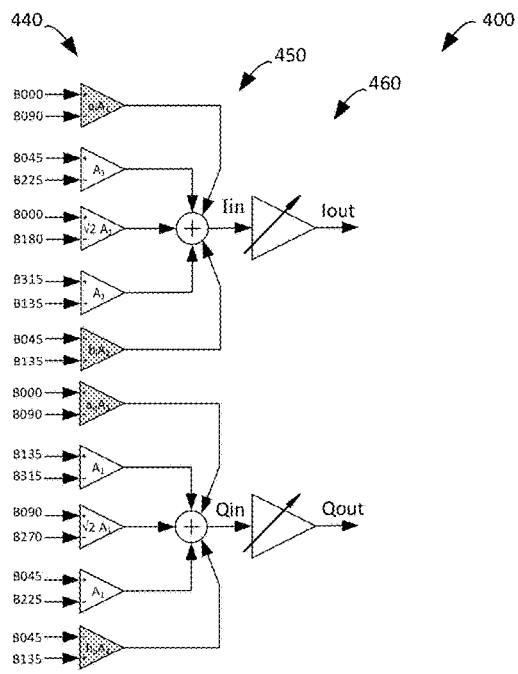
FIG. 4 illustrates a schematic diagram of a variable gain circuit of a receiver generating multiphase baseband signals.
Figure 5:
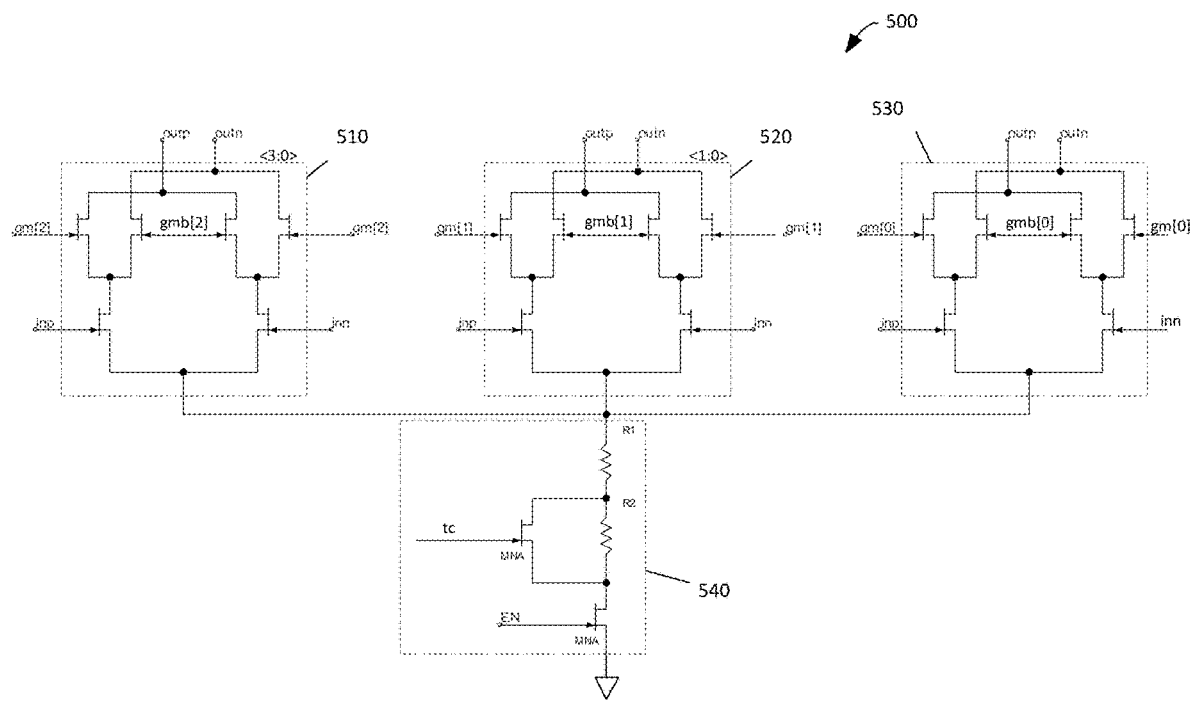
FIG. 5 is a schematic diagram of a differential transconductance amplifier which may be used in the variable gain circuit of FIG. 4.

Embodiments illustrate circuits which reduce harmonic distortion in the multiphase in-phase I and quadrature Q signals generated by a receiver circuit. FIGS. 1A and 1B respectively illustrate schematic diagrams of a receiver circuit and a transmitter circuit. FIGS. 2 and 3 illustrate a receiver circuit generating multiphase I and Q signals. FIGS. 4 and 5 illustrate a variable gain circuit of a receiver generating multiphase quadrature I and Q signals.

FIG. 1A is a schematic diagram of an embodiment of a transmitter circuit 100 according to an embodiment. Transmitter circuit 100 includes antenna or antenna array 110, switch 120, RF chain 130, and controller 140. Transmitter circuit 100 illustrates a particular example. Other embodiments of transmitter circuits may be used.

Antenna or antenna array 110 may be any antenna or antenna array. For example, in some embodiments, antenna or antenna array 110 includes 1, 2, 3, 4, or more antennas. In some embodiments, antenna or antenna array 110 includes a linear antenna array. In some embodiments, antenna or antenna array 110 includes a two dimensional antenna array, for example, having multiple rows of linear antenna arrays.

In embodiments where antenna or antenna array 110 includes one antenna, the one antenna may be connected directly to RF chain 130, and switch 120 may be omitted. In embodiments where antenna or antenna array 110 includes multiple antennas, each antenna may be directly connected to a separate RF chain. Each of the RF chains may have the features of RF chain 130.

Antenna or antenna array 110 may be configured to transmit RF signals to a receiver circuit, such as receiver circuit 200 described below with reference to FIG. 1B. The RF signals include a high frequency signal at a carrier frequency modulated with a low frequency information signal. The high frequency signal is transmitted by one of the antennas from antenna or antenna array 110, for example, according to a programmable electrical connection formed by switch 120, as controlled by controller 140. At least because of reflections, a particular signal transmitted by transmitter circuit 100 may arrive at the receiver after having traversed each of multiple transmission paths. Each of the transmission paths may terminate at the receiver with a different AoA. Additionally, the RF signals transmitted by antenna or antenna array 110 is transmitted from transmitter 100 with an AoD.

Controller 140 is configured to provide a digital signal to RF chain 130, where the digital signal encodes the information signal to be transmitted by antenna or antenna array 110.

RF chain 130 includes digital to analog converter (DAC) 132, mixer 136, frequency synthesizer 134, and power amplifier (PA) 138. RF chain 130 is an example only, and embodiments of other RF chains may alternatively be used. For example, in some embodiments, one or more additional amplifiers, and/or filters may be included, as understood by those of skill in the art.

The digital signal is processed by the digital to analog converter 132 to generate an analog baseband signal (BB signal) representing the digital signal, using techniques known in the art. Various digital to analog converter structures known in the art may be used.

Mixer 136 receives the analog baseband signal output from the digital to analog converter 132 and one or more oscillator signals at the carrier frequency generated by frequency synthesizer 134. In response to the analog baseband signal and the oscillator signal, mixer 136 up converts the analog baseband signal from the analog-to-digital converter 132 to a high frequency signal, using techniques known in the art. In some embodiments, mixer 136 receives multiple clock signals from frequency synthesizer 134, and generates multiphase baseband signals corresponding with the baseband signal. Various mixer structures known in the art may be used. The resulting high frequency signal is at the carrier frequency in this modulated so as to include the information of the low frequency information signal.

Power amplifier 138 is configured to receive the high frequency signal the high frequency signal is driven to one of the antennas from antenna or antenna array 110, for example, according to a programmable electrical connection formed by switch 120, as controlled by controller 140. The power amplifier 138 drives the high frequency signal to one of the antennas using techniques known in the art. Various power amplifier structures known in the art may be used.

As understood by those of skill in the art, using communication connectivity not illustrated in FIG. 1A, control signals from controller 140 may control certain variable functionality of switch 120, power amplifier 138, frequency synthesizer 134, mixer 136, and digital to analog converter 132, for example, as understood by those of skill in the art.

The control signals from controller 140 may, for example, control switch 120 to control which of multiple antennas RF chain 130 drives the high frequency signal with.

In embodiments having multiple antennas each connected to one of multiple RF chains, controller 140 may generate control signals for each of the RF chains.

FIG. 1B is a schematic diagram of an embodiment of a receiver circuit 200 according to an embodiment. Receiver circuit 200 includes antenna or antenna array 210, switch 220, RF chain 230, and controller 240. Receiver circuit 200 illustrates a particular example. Other embodiments of receiver circuits may be used.

Antenna or antenna array 210 may be any antenna or antenna array. For example, in some embodiments, antenna or antenna array 210 includes 1, 2, 3, 4, or more antennas.

In some embodiments, antenna or antenna array 210 includes a linear antenna array. In some embodiments, antenna or antenna array 210 includes a two dimensional antenna array, for example, having multiple rows of linear antenna arrays.

In embodiments where antenna or antenna array 210 includes one antenna, the one antenna may be connected directly to RF chain 230, and switch 220 may be omitted. In embodiments where antenna or antenna array 210 includes multiple antennas, each antenna may be directly connected to a separate RF chain. Each of the RF chains may have the features of RF chain 230.

Antenna or antenna array 210 may be configured to receive RF signals generated by a transmitter, such as transmitter 100 described above with reference to FIG. 1A. At least because of reflections, a particular signal transmitted by the transmitter may arrive at the antenna or antenna array 210 after having traversed each of multiple transmission paths.

RF chain 230 includes low noise amplifier (LNA) 232, frequency synthesizer 234, mixer 236, and analog to digital converter (ADC) 238. RF chain 230 is an example only, and embodiments of other RF chains may alternatively be used. For example, in some embodiments, one or more additional amplifiers, and/or filters may be included, as understood by those of skill in the art.

Low noise amplifier 232 is configured to receive a high frequency signal at a carrier frequency modulated with a low frequency information signal. The high frequency signal is received from one of the antennas from antenna or antenna array 210, for example, according to a programmable electrical connection formed by switch 220, as controlled by controller 240. The high frequency signal is amplified by low noise amplifier 232 to generate an amplified RF signal, using techniques known in the art. Various low noise amplifier structures known in the art may be used.

Mixer 236 receives the amplified RF signal output from the low noise amplifier 232 and one or more oscillator signals at or substantially at the carrier frequency generated by frequency synthesizer 234. In response to the amplified RF signal and the oscillator signal, mixer 236 down converts the amplified RF signal from the low noise amplifier 232 to a baseband signal, using techniques known in the art. In some embodiments, mixer 236 receives multiple clock signals from frequency synthesizer 234, and generates multiphase baseband signals. Various mixer structures known in the art may be used. The resulting baseband signal includes information of the low frequency information signal.

The baseband signal is then processed by the analog-to-digital converter 238 to generate a digital signal representing the baseband signal, using techniques known in the art. Various analog-to-digital converter structures known in the art may be used.

Controller 240 receives the digital representation of the baseband signal.

As understood by those of skill in the art, using communication connectivity not illustrated in FIG. 1B, control signals from controller 240 may control certain variable functionality of switch 220, low noise amplifier 232, frequency synthesizer 234, mixer 236, and analog-to-digital converter 238, for example, as understood by those of skill in the art.

The control signals from controller 240 may, for example, control switch 220 to select which of multiple antennas RF chain 230 receives the high frequency signals from.

For example, controller 240 may generate control signals which result in controller 240 receiving a group of digital signals, where each digital signal of the group is generated by RF chain 230 based on a high frequency signal received by a selected one of the antennas. In embodiments having multiple antennas each connected to one of multiple RF chains, controller 240 may generate control signals for each of the RF chains, such that controller 240 receives a group of digital signals, where each digital signal of the group is generated by one of the RF chains based on an RF signal received by the particular antenna connected thereto. Using techniques described below, controller 240 is configured to store the group of digital signals in a memory, and to determine an AoA or AoD for the received RF signals based on the group of digital signals it receives.

FIG. 2 illustrates a schematic diagram of portions of a receiver circuit generating multiphase in-phase I and quadrature Q signals. The receiver circuit may have features similar or identical to the features discussed above with reference to receiver circuit 200. The features of the receiver circuit may or may not be explicitly described with reference to FIG. 2. The receiver circuit is an example only, and embodiments of other receiver circuits may alternatively be used. For example, in some embodiments, one or more additional amplifiers, and/or filters may be included, as understood by those of skill in the art.

Antenna or antenna array 310 may be any antenna or antenna array. For example, in some embodiments, antenna or antenna array 310 includes 1, 2, 3, 4, or more antennas. In some embodiments, antenna or antenna array 310 includes a linear antenna array. In some embodiments, antenna or antenna array 310 includes a two dimensional antenna array, for example, having multiple rows of linear antenna arrays.

Antenna or antenna array 310 may be configured to receive RF signals generated by a transmitter, such as transmitter 100 described above with reference to FIG. 1A.

Filter 320 may be any RF filter. For example, filter 320 may be a bandpass filter or a low-pass filter. In some embodiments, filter 320 comprises a SAW filter. Filter 320 is configured to pass signals at the carrier frequency and to pass signals near the carrier frequency, according to a bandwidth, as understood by those of skill in the art.

Low noise amplifier (LNA) 332 is configured to receive a high frequency RF signal at the carrier frequency modulated with a low frequency information signal. The high frequency signal is received from one of the antennas from antenna or antenna array 310. The high frequency RF signal is amplified by low noise amplifier 332 to generate an amplified RF signal, using techniques known in the art. Various low noise amplifier structures known in the art may be used.

Mixer 336 receives the amplified RF signal output from the low noise amplifier 332 and one or more multiphase oscillator signals at or substantially at the carrier frequency generated by clock phase generator circuit 335. In response to the amplified RF signal and the multiphase oscillator signals, mixer 336 down converts the amplified RF signal from the low noise amplifier 332 to a baseband signal, using techniques known in the art. In this embodiment, mixer 336 receives a number N of multiphase oscillator signals from clock phase generator circuit 335, and generates N multiphase baseband signals. The N multiphase baseband signals are separated in phase by 360°/N, and encode I and Q information of the amplified RF signal from the LNA 332. Various mixer structures known in the art may be used.

In the illustrated embodiment, mixer 336 receives eight clock signals from frequency synthesizer 334 via clock phase generator circuit 335. Using techniques understood by those of skill in the art, mixer 336 generates eight multiphase baseband signals, B000, B045, B090, B135, B180, B225, B270, and B315. The multiphase baseband signals are separated in phase by 45°, where each label of the multiphase baseband signals B000, B045, B090, B135, B180, B225, B270, and B315 communicates the relative phase of the labeled multiphase baseband signal.

FIG. 3 illustrates a schematic diagram of a variable gain circuit 300 of a receiver circuit generating in-phase I and quadrature Q signals based on the multiphase baseband signals generated by the receiver circuit portion illustrated in FIG. 2.

Amplifiers 340 each receive two of the multiphase baseband signals B000, B045, B090, B135, B180, B225, B270, and B315. Based on the received multiphase baseband signals, each amplifier 340 generates an output signal for one of the combiners 350. Each of the combiners 350 receives signals from a number of amplifiers 340 and generates an in-phase I signal Tout or quadrature Q signal Qout for one of the variable gain amplifiers 360.

Amplifiers 340, combiners 350, and variable gain amplifiers 360 may comprise any suitable structure configured to generate the above-described signals based on the above-described received signals. Numerous suitable structures are known to those of skill in the art.

The outputs of the variable gain amplifiers 360 may then be processed by an analog-to-digital converter, such as ADC 238 of FIG. 1B. The ADC generates a digital signal representing the baseband signal, using techniques known in the art. Various analog-to-digital converter structures known in the art may be used.

At least because of mismatch in phases of the multiphase oscillator signals generated by clock phase generator circuit 335, switches of mixer 336, and gains of amplifiers 340, combiners 350, and variable gain amplifiers 360, cancellation of $3^{rd}$ and $5^{th}$ harmonics as well as even harmonics ($2^{nd}$, $4^{th}$, etc.) are not perfect.

FIG. 4 illustrates a schematic diagram of a variable gain circuit 400 of a receiver circuit generating in-phase I and quadrature Q signals based on the multiphase baseband signals generated by the receiver circuit portion illustrated in FIG. 2.

Amplifiers 440 each receive two of the multiphase baseband signals B000, B045, B090, B135, B180, B225, B270, and B315. Based on the received multiphase baseband signals, each amplifier 440 generates an output signal for one of the combiners 450. Each of the combiners 450 receives signals from a number of amplifiers 440 and generates an in-phase I signal Iin or a quadrature Q signal Qin for one of the variable gain amplifiers 460, which respectively generate an amplified in-phase I signal Tout and an amplified quadrature Q signal Qout based on the received in-phase I signal tin or quadrature Q signal Qin.

Amplifiers 440, combiners 450, and variable gain amplifiers 460 may comprise any suitable structure configured to generate the above-described signals based on the above-described received signals. Numerous suitable structures are known to those of skill in the art.

The outputs of the variable gain amplifiers 460 may then be processed by an analog-to-digital converter, such as ADC 238 of FIG. 1B. The ADC generates a digital signal representing the baseband signal, using techniques known in the art. Various analog-to-digital converter structures known in the art may be used.

It may be desirable to reduce the $2^{nd}$ harmonic because it is difficult to filter at the LNA input. To compensate for mismatch imperfections, the amplifiers 440 having gains $a_i$, $b_i$, $a_q$, and $b_q$ are included. The gains $a_i$, $b_i$, $a_q$, and $b_q$ are set such that the contribution of amplifiers 440 having gains $a_i$, $b_i$, $a_q$, and $b_q$ cancels or reduces the $2^{nd}$ harmonic.

The I and Q information of the amplified RF signal is encoded by the eight multiphase baseband signals, B000, B045, B090, B135, B180, B225, B270, and B315, and extracted by amplifiers 440, combiners 450, and variable gain amplifiers 460 as I signal Iin and Q signal Qin, as mathematically described below:

$$I_{in} = A_1[\cos(n\omega_{LO}+45*n)+\sqrt{2}\cos(n\omega_{LO}+0*n)+\cos(n\omega_{LO}+315*n)-\cos(n\omega_{LO}+225*n)-\sqrt{2}\cos(n\omega_{LO}+180*n)-\cos(n\omega_{LO}+135*n)] = A_1\cos(n\omega_{LO})[\cos(45*n)+\sqrt{2}\cos(0*n)+\sin(315*n)-\sin(225*n)-\sqrt{2}\sin(180*n)-\cos(135*n)] - A_1\sin(n\omega_{LO})[\sin(45*n)+\sqrt{2}\sin(0*n)+\sin(315*n)-\sin(225*n)-\sqrt{2}\sin(180*n)-\sin(135*n)] = \alpha_{in}\cos(n\omega_{LO})+\beta_{in}\sin(n\omega_{LO})$$

$$\alpha_{in} = \cos(45*n)+\sqrt{2}\cos(0*n)+\cos(315*n)-\cos(225*n)-\sqrt{2}\cos(180*n)-\cos(135*n) =$$

$$\beta_{in} = \sin(45*n)+\sqrt{2}\sin(0*n)+\sin(315*n)-\sin(225*n)-\sqrt{2}\sin(180*n)-\sin(135*n)$$

$$Q_{in} = A_1[\cos(n\omega_{LO}+45*n)+\sqrt{2}\cos(n\omega_{LO}+90*n)+\cos(n\omega_{LO}+135*n)-\cos(n\omega_{LO}+225*n)-\sqrt{2}\cos(n\omega_{LO}+270*n)-\cos(n\omega_{LO}+315*n)] = A_1\cos(n\omega_{LO})[\cos(45*n)+\sqrt{2}\cos(90*n)+\sin(135*n)-\sin(225*n)-\sqrt{2}\sin(270*n)-\cos(315*n)] - A_1\sin(n\omega_{LO})[\sin(45*n)+\sqrt{2}\sin(90*n)+\sin(135*n)-\sin(225*n)-\sqrt{2}\sin(270*n)-\sin(315*n)] = \alpha_{qn}\cos(n\omega_{LO})+\beta_{qn}\sin(n\omega_{LO})$$

$$\alpha_{qn} = \cos(45*n)+\sqrt{2}\cos(90*n)+\cos(135*n)-\cos(225*n)-\sqrt{2}\cos(270*n)-\cos(315*n)$$

$$\beta_{qn} = \sin(45*n)+\sqrt{2}\sin(90*n)+\sin(135*n)-\sin(225*n)-\sqrt{2}\sin(270*n)-\sin(315*n)$$

where n is the harmonic number, and
where: $\alpha_{in}$, $\beta_{in}$, $\alpha_{qn}$, and $\beta_{qn}$ for each harmonic correspond with the following table.

| n | 1 | 3 | 5 | 7 | 9 | 11 |
|---|---|---|---|---|---|---|
| $\alpha_{in}$ | 5.66 | 0 | 0 | 5.66 | 5.66 | 0 |
| $\beta_{in}$ | 0 | 0 | 0 | 0 | 0 | 0 |
| $\alpha_{qn}$ | 0 | 0 | 0 | 0 | 0 | 0 |
| $\beta_{qn}$ | 5.66 | 0 | 0 | 5.66 | 5.66 | 0 |

As discussed above, the gains $a_i$, $b_i$, $a_q$, and $b_q$ are set such that the contribution of amplifiers 440 having gains $a_i$, $b_i$, $a_q$, and $b_q$ cancels or reduces the $2^{nd}$ harmonic. Any method of determining the gains al, $a_q$, and $b_q$ may be used.

For example, gains $a_i$, $b_i$, $a_q$, and $b_q$ for the appropriate amplifiers 440 may be realized with a permanently programmable structure, such as trimmable resistors or blowable fuses, which is programmed as part of a test procedure using, for example, automatic test equipment (ATE) testers. During the testing process, one or more test signals are provided to a mixer, such as mixer 336 of FIG. 2 of a receiver. The mixer 336 receives the test signals and a number N of multiphase oscillator signals generated by a clock phase generator circuit, such as clock phase generator circuit 335 of FIG. 2. The mixer generates N multiphase baseband signals, and I and Q signals are generated based on the N multiphase baseband signals using circuitry such as that illustrated in FIG. 4 while the amplifiers having gains $a_i$, $b_i$, $a_q$, and $b_q$ are disabled. The $2^{nd}$ harmonics of the I and Q signals are respectively determined. The gains $a_i$, and $b_i$ are determined based on the $2^{nd}$ harmonic of the I signal Iout based, for example, on the mathematical relationship between the gains $a_i$, and $b_i$ and their effect on the $2^{nd}$ harmonic of the I signal Tout, as, for example, discussed above. Similarly, the gains $a_q$, and $b_q$ are determined based on the $2^{nd}$ harmonic of the Q signal Qout based, for example, on the mathematical relationship between the gains $a_q$, and $b_q$ and their effect on the $2^{nd}$ harmonic of the Q signal Tout, as, for example, discussed above. Once the gains $a_i$, $b_i$, $a_q$, and $b_q$ are determined, the permanently programmable structure is programmed so that the appropriate amplifiers 440 have the desired gains $a_i$, $b_i$, $a_q$, and $b_q$, as understood by those of skill in the art.

In some embodiments, gains $a_i$, $b_i$, $a_q$, and $b_q$ for the appropriate amplifiers 440 may be realized with a programmable structure, such as a register, which is programmed as part of a calibration routine. The calibration routine use steps similar or identical to those used by the testing process discussed above to determine the gains $a_i$, $b_i$, $a_q$, and $b_q$. Once the gains $a_i$, $b_i$, $a_q$, and $b_q$ are determined, the programmable structure is programmed so that the appropriate amplifiers 440 have the desired gains $a_i$, $b_i$, $a_q$, and $b_q$, as understood by those of skill in the art. The calibration routine may be used as part of a startup procedure, and/or during other times of operation.

In some embodiments, gains $a_i$, $b_i$, $a_q$, and $b_q$ may be determined as part of a design to cancel $2^{nd}$ harmonic distortion caused, for example, by design imbalances.

In the illustrated examples, $2^{nd}$ harmonic distortion is reduced or eliminated by the amplifiers having gains $a_i$, $b_i$, $a_q$, and $b_q$. In alternative embodiments distortion from other harmonics are additionally or alternatively reduced or eliminated by amplifiers having gains and inputs determined based on principles discussed herein as applied by those of skill in the art.

In the illustrated example, mixer 336 receives eight multiphase oscillator signals from clock phase generator circuit 335, and generates eight multiphase baseband signals for the circuitry of FIG. 4. In alternative embodiments, mixers receive a different number of multiphase oscillator signals from a clock phase generator circuit, and generate a corresponding number of multiphase baseband signals for circuitry similar to that of FIG. 4, where the circuitry is configured to generate I signals and Q signals based on the received multiphase baseband signals according to principles discussed herein as applied by those of skill in the art.

FIG. 5 is a schematic diagram of a programmable differential transconductance amplifier 500 which may be used in the variable gain circuit of FIG. 4 as any or all of amplifiers 440. Other amplifier architectures may be used as any or all of amplifiers 440. In some embodiments, the amplifiers 440 having gains $a_i$, $b_i$, $a_q$, and $b_q$ are implemented with features similar or identical to those of amplifier 500. In some embodiments, variable gain amplifiers 460 are additionally implemented with features similar or identical to those of amplifier 500. In some embodiments, amplifiers 440 other than those having gains $a_i$, $b_i$, $a_q$, and $b_q$ are implemented with features similar or identical to those of amplifier 500. In some embodiments, amplifiers 440 other than those having gains $a_i$, $b_i$, $a_q$, and $b_q$ are implemented with features different from those of amplifier 500. Amplifier 500 includes binary weighted groups 510, 520, and 530 of differential circuits, and includes tail current source 540.

Tail current source 540 sinks a programmable amount of current on the condition that an unable signal at input node EN causes tail current source 540 to sink current. As illustrated, the resistance of tail current source 540 is equal to either the resistance of resistor R1 or is equal to the sum of the resistances of resistors R1 and R2, according to the tail current control signal at node tc. In some embodiments, the resistance of resistor R1 is equal to the resistance of resistor R2, such that the current which tail current source 540 sinks is one of first and second current values, where the second current value is two times the first current value.

In this embodiment, group 510 includes four instances of a differential circuit group 520 includes two instances of the differential circuit, and group 530 includes one instance of the differential circuit.

As understood by those of skill in the art, the differential circuits collectively steer the tail current sunk by tail current source 540 from positive and negative output nodes outp and outn. The portions of the tail current from each of positive and negative output nodes outp and outn is determined based on the difference of the voltages at input nodes inp and inn and based on the states of each of the complimentary control signals at control input nodes gm[2:0] and gmb[2:0], as understood by those of skill in the art.

The control signals at control input nodes gm[2:0] and gmb[2:0] may be received, for example, from a programmable structure programmed, for example using a programming procedure similar or identical to those discussed above.

Embodiments of the variable gain circuit 400 of FIG. 4 that include implementations of programmable differential transconductance amplifier 500, include combiners having properties of combiners 450 and that are configured to source current to the positive and negative output nodes outp and outn of the of programmable differential transconductance amplifier 500. Any suitable combiner circuit structure may be used to perform the described operations of the combiners. Numerous suitable structures are known to those of skill in the art. For example, embodiments of the variable gain circuit 400 of FIG. 4 that include implementations of programmable differential transconductance amplifier 500, may include combiners which simply short the positive and negative output nodes outp and outn of the of programmable differential transconductance amplifiers. Embodiments of the variable gain circuit 400 of FIG. 4 that include other implementations of programmable amplifiers use other suitable combiner structures.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A receiver circuit, comprising:
 a mixer configured to receive an RF signal, wherein the RF signal encodes an information signal, wherein the mixer is further configured to receive a number N of multiphase oscillator signals and to generate N multiphase baseband signals, and wherein the multiphase baseband signals encode a first representation of the information signal;
 a variable gain circuit comprising a plurality of amplifiers, each configured to receive a subset of the N multiphase baseband signals, wherein a first subset of the amplifiers collectively generate a first output signal that encodes a second representation of the information signal, wherein the first output signal has a first distortion, wherein a second subset of the amplifiers collectively generate a second output signal, wherein the second output signal has a second distortion, wherein each of the second subset of the amplifiers has a programmable gain which influences the second distortion, and wherein the first subset of the amplifiers is different from the second subset of the amplifiers;
 wherein the variable gain circuit is configured to generate a reduced distortion output signal based on the first and second output signals, wherein the reduced distortion output signal has a reduced distortion, wherein the first and second distortions of the first and second output signals each have an influence on the reduced distortion of the reduced distortion output signal, and wherein the influence of the second distortion on the reduced distortion of the reduced distortion output signal at least partly cancels the influence of the first distortion on the reduced distortion of the reduced distortion output signal.

2. The receiver circuit of claim 1, wherein each of the first subset of amplifiers generates a first amplifier output, wherein the first output signal comprises the first amplifier outputs of the first subset of amplifiers, wherein each of the second subset of amplifiers generates a second amplifier output, and wherein the second output signal comprises the second amplifier outputs of the second subset of amplifiers.

3. The receiver circuit of claim 1, further comprising a combiner configured to receive the first and second output signals and to generate the reduced distortion output signal based on the received first and second output signals.

4. The receiver circuit of claim 1, wherein the first distortion comprises a particular harmonic of a frequency of the multiphase oscillator signals, wherein the second distortion comprises the particular harmonic of the frequency of the multiphase oscillator signals, and wherein the influence of the second distortion on the particular harmonic in the reduced distortion of the reduced distortion output signal at least partly cancels the influence of the first distortion on the particular harmonic in the reduced distortion of the reduced distortion output signal.

5. The receiver circuit of claim 4, wherein the particular harmonic is the second harmonic of the frequency of the multiphase oscillator signals.

6. The receiver circuit of claim 1, wherein a first portion of first subset of the amplifiers collectively generate an in-phase component of the first output signal, and wherein a second portion of first subset of the amplifiers collectively generate a quadrature component of the first output signal.

7. The receiver circuit of claim 6, wherein a first portion of second subset of the amplifiers collectively generate an in-phase component of the second output signal, and wherein a second portion of second subset of the amplifiers collectively generate a quadrature component of the second output signal.

8. The receiver circuit of claim 7, wherein:
the in-phase component of the first output signal comprises a first in-phase distortion, wherein the in-phase component of the second output signal comprises a second in-phase distortion, and wherein a magnitude of the first in-phase distortion is greater than a magnitude of a sum of the first and second in-phase distortions; and
the quadrature component of the first output signal comprises a first quadrature distortion, wherein the quadrature component of the second output signal comprises a second quadrature distortion, and wherein a magnitude of the first quadrature distortion is greater than a magnitude of a sum of the first and second quadrature distortions.

9. A method of using a receiver circuit, the method comprising:
with a mixer, receiving an RF signal, wherein the RF signal encodes an information signal;
with the mixer, receiving a number N of multiphase oscillator signals and generating N multiphase baseband signals, wherein the multiphase baseband signals encode a first representation of the information signal;
with each of a plurality of amplifiers of a variable gain circuit, receiving a subset of the N multiphase baseband signals;
with a first subset of the amplifiers, collectively generating a first output signal that encodes a second representation of the information signal, wherein the first output signal has a first distortion;
with a second subset of the amplifiers, collectively generating a second output signal, wherein the second output signal has a second distortion, wherein each of the second subset of the amplifiers has a programmable gain which influences the second distortion, and wherein the first subset of the amplifiers is different than the second subset of the amplifiers;
with the variable gain circuit, generating a reduced distortion output signal based on the first and second output signals, wherein the reduced distortion output signal has a reduced distortion, wherein the first and second distortions of the first and second output signals each have an influence on the reduced distortion of the reduced distortion output signal, and wherein the influence of the second distortion on the reduced distortion of the reduced distortion output signal at least partly cancels the influence of the first distortion on the reduced distortion of the reduced distortion output signal.

10. The method of claim 9, further comprising:
with each of the first subset of amplifiers, generating a first amplifier output, wherein the first output signal comprises the first amplifier outputs of the first subset of amplifiers; and
with each of the second subset of amplifiers, generating a second amplifier output, wherein the second output signal comprises the second amplifier outputs of the second subset of amplifiers.

11. The method of claim 9, further comprising:
with a combiner, receiving the first and second output signals; and
generating the reduced distortion output signal based on the received first and second output signals.

12. The method of claim 9, wherein the first distortion comprises a particular harmonic of a frequency of the multiphase oscillator signals, wherein the second distortion comprises the particular harmonic of the frequency of the multiphase oscillator signals, and wherein the influence of the second distortion on the particular harmonic in the reduced distortion of the reduced distortion output signal at least partly cancels the influence of the first distortion on the particular harmonic in the reduced distortion of the reduced distortion output signal.

13. The method of claim 12, wherein the particular harmonic is the second harmonic of the frequency of the multiphase oscillator signals.

14. The method of claim 9, wherein a first portion of first subset of the amplifiers collectively generate an in-phase component of the first output signal, and wherein a second portion of first subset of the amplifiers collectively generate a quadrature component of the first output signal.

15. The method of claim 14, wherein a first portion of second subset of the amplifiers collectively generate an in-phase component of the second output signal, and wherein a second portion of second subset of the amplifiers collectively generate a quadrature component of the second output signal.

16. The method of claim 15, wherein:
the in-phase component of the first output signal comprises a first in-phase distortion, wherein the in-phase component of the second output signal comprises a second in-phase distortion, and wherein a magnitude of the first in-phase distortion is greater than a magnitude of a sum of the first and second in-phase distortions; and
the quadrature component of the first output signal comprises a first quadrature distortion, wherein the quadrature component of the second output signal comprises a second quadrature distortion, and wherein a magnitude of the first quadrature distortion is greater than a magnitude of a sum of the first and second quadrature distortions.

17. The method of claim 9, further comprising, programming the programmable gain of each of the second subset of the amplifiers.

18. The method of claim 17, further comprising, measuring the first distortion, wherein programming the programmable gain of each of the second subset of the amplifiers comprises causing a magnitude of a sum of the first and second distortions to be less than a magnitude of the first distortion.

19. The method of claim 18, wherein measuring the first distortion, and programming the programmable gain of each of the second subset of the amplifiers is performed as part of a test procedure.

20. The method of claim 18, wherein measuring the first distortion, and programming the programmable gain of each of the second subset of the amplifiers is performed as part of a calibration.

* * * * *